United States Patent
Choi et al.

(10) Patent No.: US 8,812,675 B2
(45) Date of Patent: Aug. 19, 2014

(54) METHOD FOR MULTI-POINT COOPERATION CONSIDERING DELAY IN A WIRELESS COMMUNICATION SYSTEM

(75) Inventors: Hyun Ho Choi, Suwon-si (KR); Jong Bu Lim, Yongin-si (KR); Byoung Hoon Jung, Daejeon (KR); Dan Keun Sung, Daejeon (KR); Seon Yeob Baek, Daejeon (KR); Kab Seok Ko, Daejeon (KR); Ji Young Cha, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 923 days.

(21) Appl. No.: 12/731,296

(22) Filed: Mar. 25, 2010

(65) Prior Publication Data

US 2011/0070884 A1 Mar. 24, 2011

(30) Foreign Application Priority Data

Sep. 22, 2009 (KR) ........................ 10-2009-0089354

(51) Int. Cl.
*H04W 72/04* (2009.01)

(52) U.S. Cl.
USPC ....................................................... 709/226

(58) Field of Classification Search
USPC ................................................ 370/328–338
See application file for complete search history.

(56) References Cited

U.S. PATENT DOCUMENTS

| | | |
|---|---|---|
| 2008/0188234 A1 | 8/2008 | Gorokhov et al. |
| 2008/0247364 A1 | 10/2008 | Kim et al. |
| 2009/0046671 A1 * | 2/2009 | Luo ................................ 370/336 |
| 2010/0189038 A1 * | 7/2010 | Chen et al. ..................... 370/328 |
| 2010/0195566 A1 * | 8/2010 | Krishnamurthy et al. ..... 370/328 |
| 2012/0155366 A1 * | 6/2012 | Zirwas et al. .................. 370/312 |
| 2012/0218946 A1 * | 8/2012 | Ohshima et al. ............... 370/328 |

FOREIGN PATENT DOCUMENTS

KR 10-2009-0056206 6/2009

OTHER PUBLICATIONS

Zhou, Mingyu, et al. "Analysis into Timing Advance issue in CoMP Systems." Proceedings of 2009 IEEE 70th Vehicular Technology Conference. IEEE, 2009 (5 pages, in English).
Chinese Office Action mailed Mar. 27, 2014 in counterpart Chinese Application No. 201080042238.0 (11 pages, in Chinese, with complete English translation).

* cited by examiner

*Primary Examiner* — Hassan Phillips
*Assistant Examiner* — Omeed D Rahgozar
(74) *Attorney, Agent, or Firm* — NSIP Law

(57) ABSTRACT

Provided is a method of a multi-node cooperation considering a delay in a wireless communication system. A frame format may perform scheduling so that uplink cooperation terminals having a similar delay attribute may be classified into an uplink cooperation zone, to thereby prevent interference between the uplink cooperation zone and a non-cooperation zone. An extended cyclic prefix may be applied according to a delay attribute occurring due to an application of the multi-node cooperation. A cooperation base station of an uplink and a downlink may be determined based on the extended cyclic prefix.

9 Claims, 9 Drawing Sheets

FIG. 2
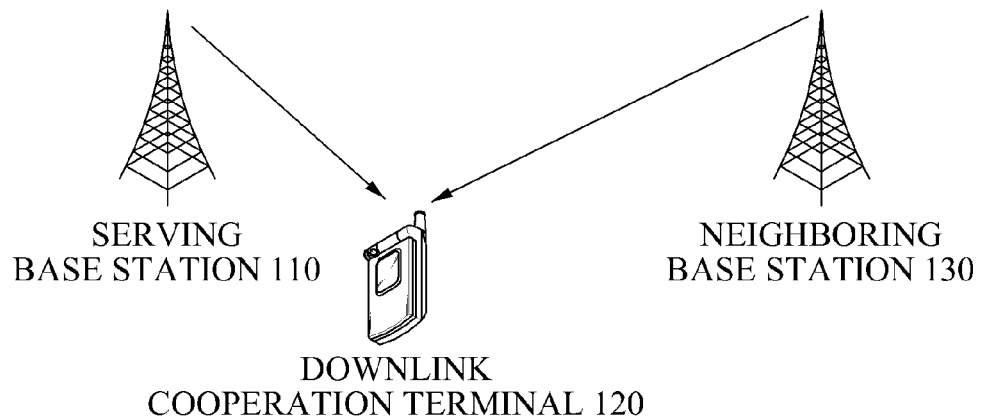
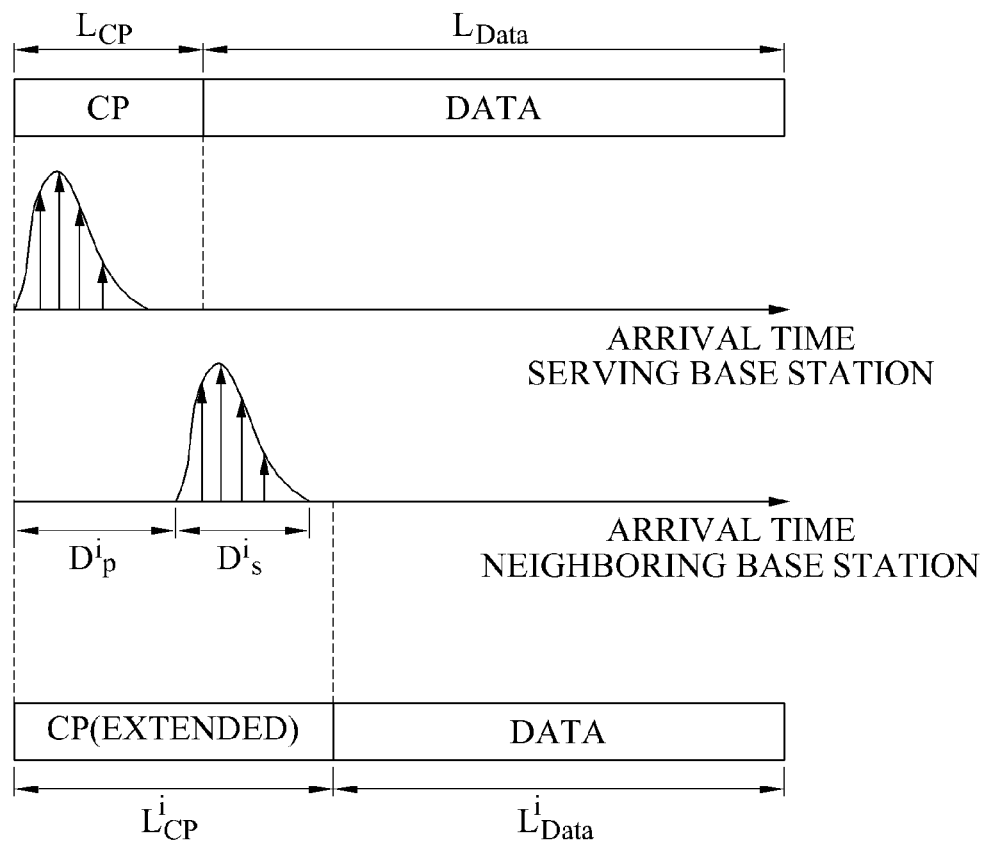

FIG. 4
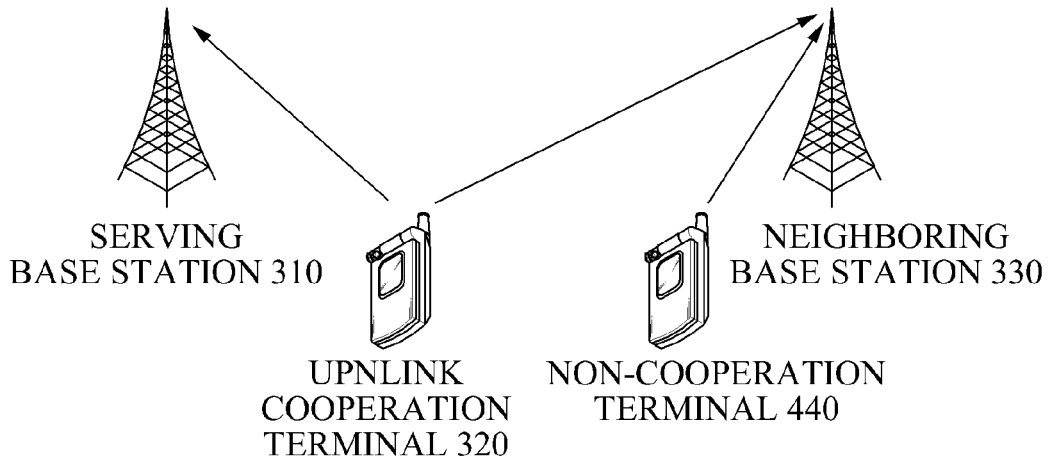
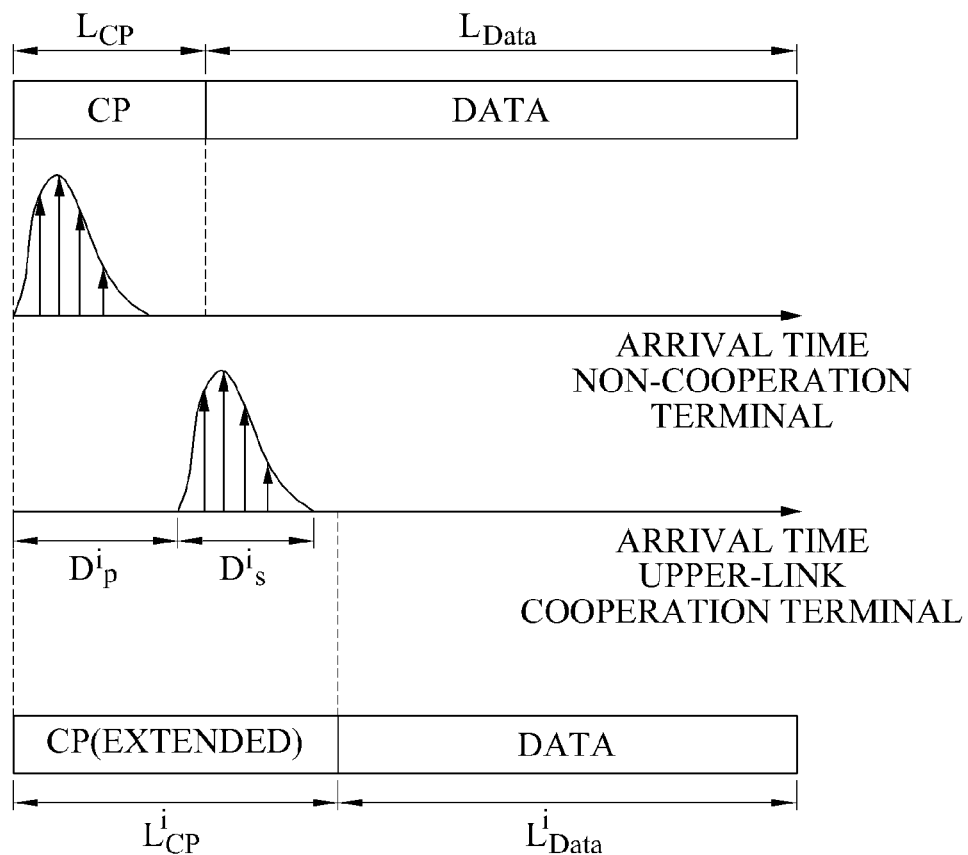

METHOD FOR MULTI-POINT COOPERATION CONSIDERING DELAY IN A WIRELESS COMMUNICATION SYSTEM

CROSS-REFERENCE TO RELATED APPLICATION(S)

This application claims the benefit under 35 U.S.C. §119(a) of Korean Patent Application No. 10-2009-0089354, filed on Sep. 22, 2009, in the Korean Intellectual Property Office, the entire disclosure of which is incorporated herein by reference for all purposes.

BACKGROUND

1. Field

The following description relates to a method of performing a multi-point cooperation in a wireless communication system, and more particularly, to a method of performing a multi-point cooperation that may cluster base stations to participate in a multi-point cooperation based on a delay occurring due to the multi-point cooperation.

2. Description of Related Art

Multi-point cooperation technology enables a plurality of base stations or transmission nodes to cooperate with a terminal located at a cell boundary or a terminal having a weak reception signal, and to simultaneously transmit signals to a corresponding or neighboring terminal to thereby enhance a data rate at the terminal. In response to the terminal located at the cell boundary performing the multi-point cooperation, a propagation delay characteristic of a signal transmitted from a cooperation base station may vary depending on a distance between the cooperation base station and a terminal, and a communication environment. Accordingly, where a plurality of base stations simultaneously transmits signals to a corresponding terminal, the signals may be received by the terminal at various different points in time. A phenomenon that a delay time of each signal varies due to multiple paths may be referred to as a delay spread.

In a conventional wireless mobile communication system, each symbol may include a guard interval based on the delay spread. The guard interval functions to prevent inter-symbol interference. Generally, to prevent inter-channel interference, a guard interval zone may copy a portion of an end of a transmission symbol and transmit the copied portion, which is referred to as a cyclic prefix (CP). A cyclic prefix length may be determined based on a delay spread value. The inter-symbol interference or the inter-channel interference may not occur where the cyclic prefix length is greater than the delay spread value.

In the case of the multi-point cooperation, a multi-point cooperation gain may increase according to an increase in a number of base stations participating in the multi-point cooperation. However, in this case, the delay spread may also increase and the cyclic prefix length may also require an increase. As a result, the increase in the cyclic prefix length may cause an overhead, wasting radio resources.

Accordingly, in the case of the multi-point cooperation, a trade-off relationship may exist between a performance gain increasing according to an increasing in the number of cooperation base stations and the overhead occurring due to the increase in the cyclic prefix length.

SUMMARY

In one general aspect, a method to perform a downlink multi-point cooperation at a serving base station of a wireless communication system, includes transmitting a reference signal, receiving, from a downlink cooperation terminal, a channel gain value, a propagation delay value, and a delay spread value that are calculated by the downlink cooperation terminal with respect to each of the serving base station and a plurality of neighboring base stations, determining a length of an extended cyclic prefix of each of the plurality of neighboring base stations based on the propagation delay value and the delay spread value, and determining, as a cooperation base station, one of the plurality of the neighboring base stations that includes a multi-point cooperation gain compared to an overhead occurring due to an increase in the length of the extended cyclic prefix.

The determining of the length of the extended cyclic prefix may include determining, as the extended cyclic prefix, a value greater than a sum of the propagation delay value and the delay spread value corresponding to each of the neighboring base stations.

The method may further include requesting the determined cooperation base station corresponding to a downlink cooperation, scheduling a downlink cooperation, transmitting downlink cooperation scheduling information to the downlink cooperation terminal and the cooperation base station, and transmitting downlink cooperation data to the downlink cooperation terminal and the cooperation base station based on the downlink cooperation scheduling information.

In response to the downlink cooperation terminal receiving downlink cooperation data from the serving base station, and receiving downlink cooperation data from the cooperation base station, the downlink cooperation terminal may combine the downlink cooperation data of the serving base station with the downlink cooperation data of the cooperation base station.

In another general aspect, a method of performing an uplink multi-point cooperation at a serving base station of a wireless communication system, includes receiving a reference signal from a terminal, calculating a channel gain value, a propagation delay value, and a delay spread value of the serving base station based on the reference signal, receiving, from a plurality of neighboring base stations, a channel gain value, a propagation delay value, and a delay spread value of each of the plurality of neighboring base stations that are calculated based on the reference signal, determining a length of an extended cyclic prefix of each of the plurality of neighboring base stations based on the propagation delay value and the delay spread value, and determining, as a cooperation base station, a neighboring base station from among the plurality of neighboring base stations that includes a multi-point cooperation gain compared to an overhead occurring due to an increase in the length of the extended cyclic prefix.

The determining of the length of the extended cyclic prefix may include determining, as the extended cyclic prefix, a value greater than an addition value of the propagation delay value and the delay spread value corresponding to each of the neighboring base stations.

The method may further include requesting the determined cooperation base station corresponding to an uplink cooperation, scheduling an uplink cooperation, transmitting uplink cooperation scheduling information to the terminal and the cooperation base station, and transmitting the uplink cooperation data to the terminal and the cooperation base station based on the uplink cooperation scheduling information.

In response to the terminal receiving uplink cooperation data from the serving base station and receiving uplink cooperation data from the cooperation base station, the terminal may combine the uplink cooperation data of the serving base station with the uplink cooperation data of the cooperation base station.

In still another general aspect, a method of performing an uplink multi-point cooperation at a serving base station of a wireless communication system, includes receiving uplink cooperation data from uplink cooperation terminals, receiving, from a cooperation base station, uplink cooperation data of each of the uplink cooperative terminals received at the cooperation base station, receiving, from the cooperation base station, a delay attribute of each of the uplink cooperation terminals calculated at the cooperation base station, and scheduling the uplink cooperation terminals so that the uplink cooperation terminals having a similar delay attribute are located in the same uplink cooperation zone.

The scheduling may include dividing an uplink into an uplink cooperation zone and a non-cooperation zone, and scheduling the uplink cooperation terminals so that the uplink cooperation terminals having the similar delay attribute are located in the same uplink cooperation zone.

The scheduling may include inserting a guard interval between the uplink cooperation zone and the non-cooperation zone.

The method may further include transmitting scheduling information to the uplink cooperation terminals and the cooperation base station, and transmitting framework information of the uplink cooperation zone to the uplink cooperation terminals.

The framework information of the uplink cooperation zone may include information regarding a frame format of the uplink cooperation zone, a length of a guard interval, a length of a cyclic prefix, and a length of data.

In the framework information of the uplink cooperation zone, a length of data included in a last symbol of the uplink cooperation zone may be shortened to prevent interference in the non-cooperation zone that is located next to the uplink cooperation zone.

In response to the cooperation base station receiving the scheduling information, the cooperation base station may transmit framework information of a non-cooperation zone to uplink non-cooperation terminals included in the cooperation base station.

In response to the framework information of the non-cooperation zone being located next to the uplink cooperation zone, the framework information of the non-cooperation zone may include six symbols and each of the six symbols may include an extended cyclic prefix.

In response to the framework information of the non-cooperation zone being located next to the uplink cooperation zone, a first symbol of the non-cooperation zone may include an extended cyclic prefix and data having a length shortened by an amount corresponding to an extension of the extended cyclic prefix.

In response to the framework information of the non-cooperation zone being located next the uplink cooperation zone, a guard interval may be inserted into a first symbol of the non-cooperation zone and the first symbol may include data having a length shortened by a length of the guard interval.

Other features and aspects will be apparent from the following detailed description, the drawings, and the claims.

BRIEF DESCRIPTION OF THE DRAWINGS

FIG. 2 is a diagram illustrating examples of a propagation delay and a delay spread characteristic occurring in a downlink multi-point cooperation of a wireless communication system.

FIG. 4 is a diagram illustrating examples of a propagation delay and a delay spread characteristic occurring in an uplink multi-point cooperation of a wireless communication system.

Figure 1:
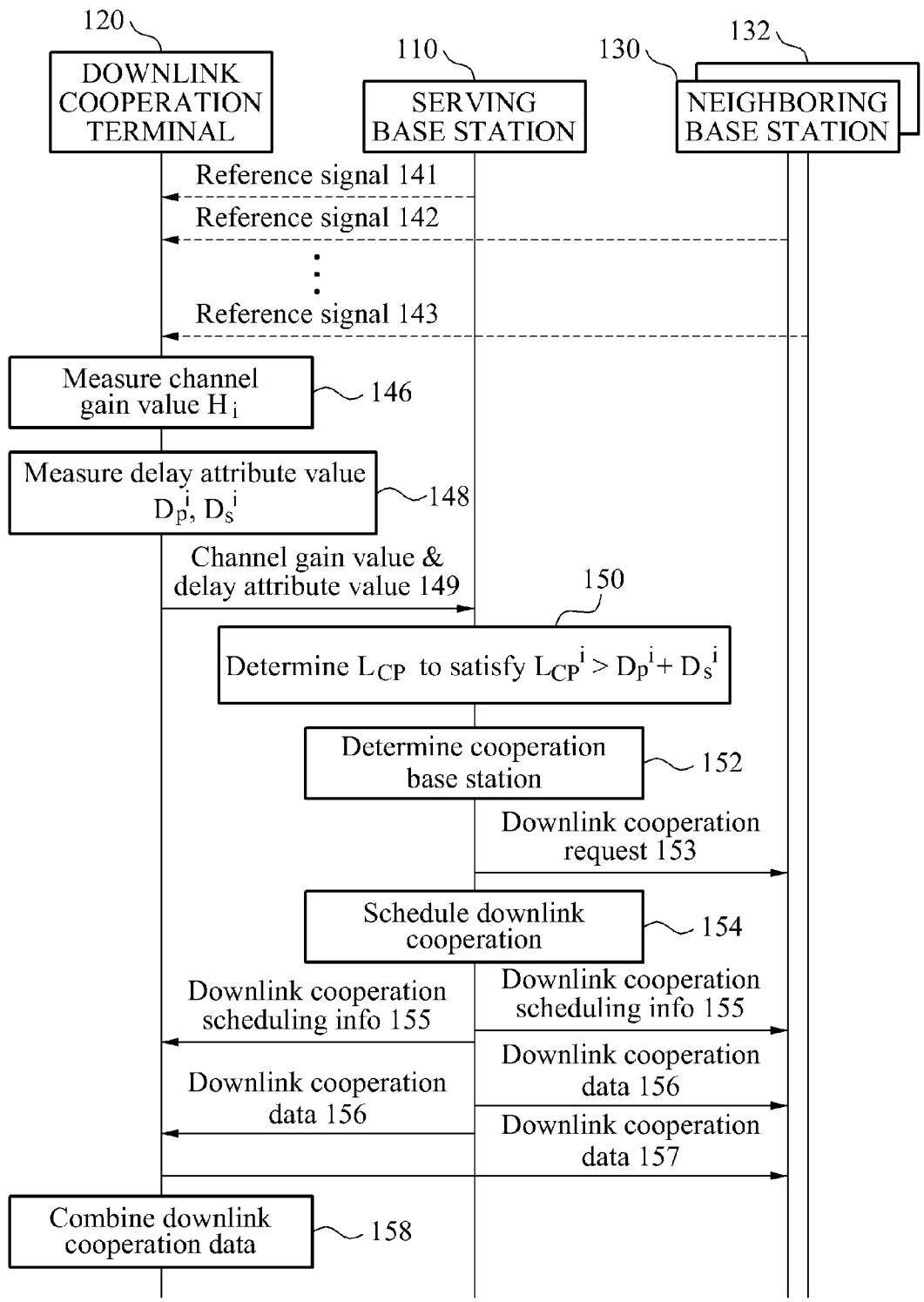
FIG. 1 is a diagram illustrating an example of a process of determining a downlink cooperation base station in a wireless communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a process of determining a downlink cooperation base station in a wireless communication system.

Referring to FIG. 1, a downlink cooperation terminal 120 receives a reference signal 141 from a serving base station 110, and also receives reference signals 142 and 143 from neighboring base stations 130 and 132, respectively. At 146, the downlink cooperation terminal 120 measures a channel gain value $H_i$ of each of the serving base station 110 and the neighboring base stations 130 and 132 based on the received reference signals 141, 142, and 143, respectively. At 148, the downlink cooperation terminal 120 measures a delay attribute value of each of the serving base station 110 and the neighboring base stations 130 and 132 based on the received reference signals 141, 142, and 143, respectively. The delay attribute value may include a propagation delay value ($D^i_p$) and a delay spread value ($D^i_s$).

At 149, the downlink cooperation terminal 120 transmits both the measured channel gain value and the delay attribute value to the serving base station 110.

In response to the serving base station 110 receiving the channel gain value and the delay attribute value from the downlink cooperation terminal 120, the serving base station 110 determines, as an extended cyclic prefix (CP), a value greater than sum of the propagation delay value and the delay spread value corresponding to each of the neighboring base stations 130 and 132 at 150.

At 152, the serving base station 110 determines a neighboring base station to be a cooperation base station, for example, the neighboring base station 130 that includes a multi-point gain compared to an overhead occurring due to an increase in the length of the extended cyclic prefix. Hereinafter, the neighboring base station 130 is referred to as the cooperation base station 130.

At 153, the serving base station 110 sends a request of a downlink cooperation corresponding to the determined cooperation base station 130. In response to the cooperation base station 130 accepting the downlink cooperation request, the serving base station 110 schedules the downlink cooperation at 154, and subsequently transmits downlink cooperation scheduling information 155 to the downlink cooperation terminal 120 and the cooperation base station 130, respectively.

The serving base station 110 also transmits downlink cooperation data 156 to the downlink cooperation terminal 120 and the cooperation base station 130, respectively, based on the downlink cooperation scheduling information 155.

The cooperation base station 130 transfers the downlink cooperation data 157 to the downlink cooperation terminal 120.

In response to the downlink cooperation terminal 120 receiving the downlink cooperation data 156 from the serving base station 110 and the downlink cooperation data 157 from the cooperation base station 130, the downlink cooperation terminal 120 combines the downlink cooperation data 156 of the serving base station 110 with the downlink cooperation data 157 of the cooperation base station 130 at 158.

Referring to FIG. 1, a scheme of determining the length of the extended cyclic prefix at 150 and a scheme of determining the cooperation base station at 152 will be further described with reference to FIG. 2.

FIG. 2 illustrates examples of a propagation delay and a delay spread characteristic occurring in a downlink multi-point cooperation of a wireless communication system.

Referring to FIG. 2, to provide the multi-point cooperation, a neighboring base station 130 may need to adjust a length of a cyclic prefix based on a measured delay spread value. The length of the extended cyclic prefix may be determined to satisfy the following Equation 1.

$$L^i_{CP} > D^i_P + D^i_S \quad \text{[Equation 1]}$$

In the above example depicted in Equation 1, i denotes a neighboring base station, $L^i_{CP}$ denotes a length of a cyclic prefix needed where a downlink cooperation with the neighboring base station is performed, $D^i_P$ denotes a delay difference between a signal received from the neighboring base station and a signal received from a current serving base station, and $D^i_S$ denotes a delay spread value of the neighboring base station.

Referring to FIG. 2, in response to a multi-point cooperation gain existing as compared to an overhead occurring due to an increase in the length of the extended cyclic prefix according to the above Equation 1 existing, a corresponding neighboring base station 130 may be determined as a cooperation base station 130. For example, where the following Equation 2 is satisfied, the corresponding neighboring base station 130 may be determined as the cooperation base station 130.

$$\frac{R^i_{CoMP}}{R_{NoCoMP}} > \frac{1 + O^i_{CP}}{1 + O_{CP}} \quad \text{[Equation 2]}$$

where $$O_{CP} = \frac{L_{CP}}{L_{Data}},$$

$$O^i_{CP} = \frac{L^i_{CP}}{L^i_{Data}}$$

In the above example depicted in Equation 2, $R^i_{CoMP}$ denotes a reception capacity of a terminal where the downlink cooperation with the neighboring base station 130 is performed, $R_{NoCoMP}$ denotes the reception capacity of the terminal where the downlink cooperation is not performed, $L^i_{CP}$ denotes the length of the cyclic prefix needed where the downlink cooperation with the neighboring base station is performed, $L_{CP}$ denotes a length of a normal cyclic prefix where the downlink cooperation is not performed, $L^i_{data}$ denotes a length of data that may be input where the downlink cooperation with the neighboring base station 130 is performed, and $L_{data}$ denotes a length of data that may be generally input where the downlink cooperation is not performed.

Figure 3:
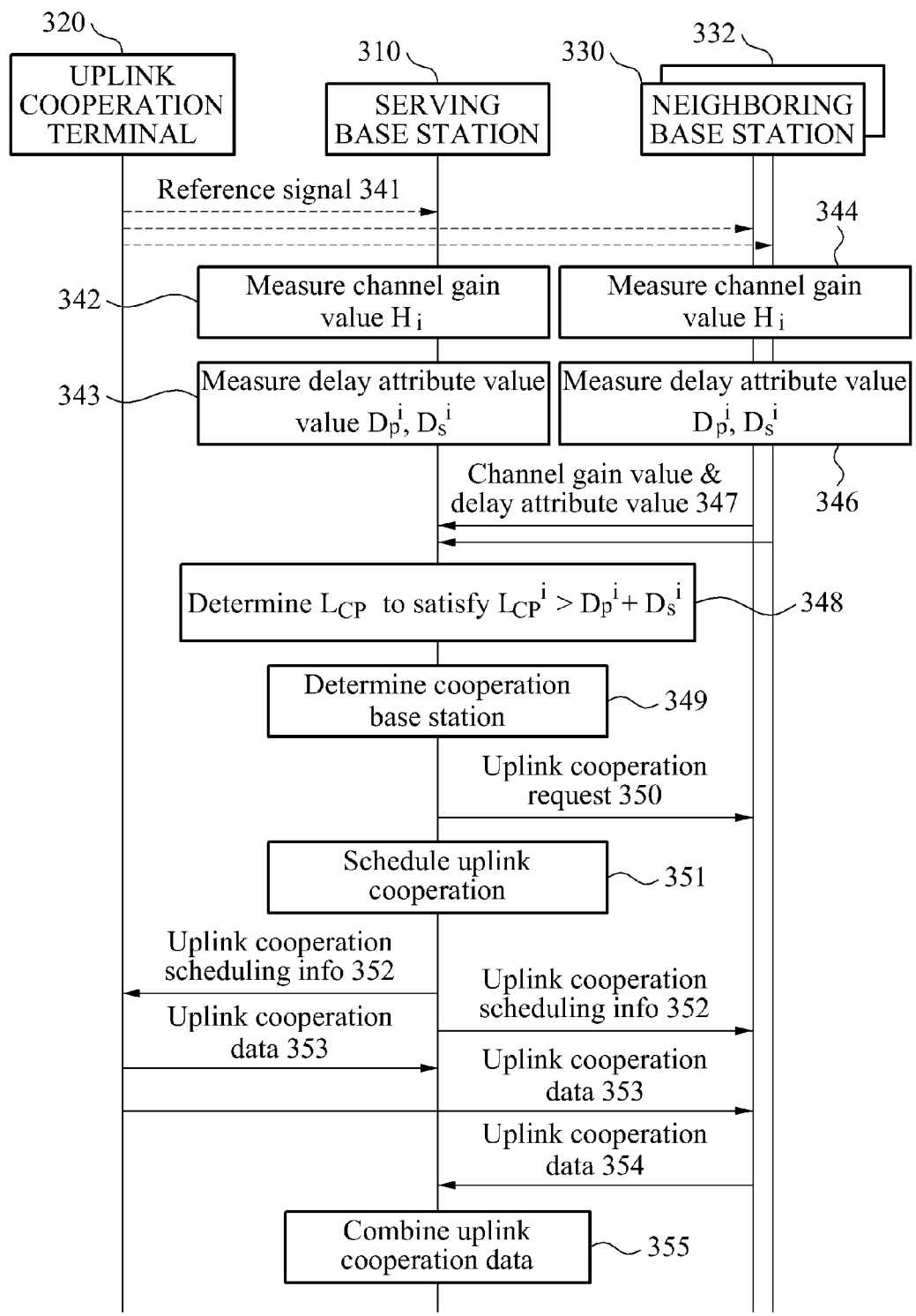
FIG. 3 is a diagram illustrating an example of a process of determining an uplink cooperation base station in a wireless communication system.

FIG. 3 illustrates an example of a process of determining an uplink cooperation base station in a wireless communication system.

Referring to FIG. 3, an uplink cooperation terminal 320 transmits a reference signal 341 to a serving base station 310 and neighboring base stations 330 and 332, respectively.

Where the reference signal 341 is received, the serving base station 310 measures a channel gain value of the uplink cooperation terminal 320 at operation 342, and measures a delay attribute value of the uplink cooperation terminal 320 at operation 343.

In response to the reference signal 341 being received, each of the neighboring base stations 330 and 332 measures the channel gain value of the uplink cooperation terminal 320 at operation 344, and measures the delay attribute value of the uplink cooperation terminal 320 at operation 346. Subsequently, the neighboring base stations 330 and 332 transmit the measured channel gain value and the delay attribute value to the serving base station 310 at operation 347.

In response to the serving base station 310 receiving the channel gain value and the delay attribute value from each of the neighboring base stations 330 and 332, respectively, the serving base station 310 determines, as an extended cyclic prefix, a value greater than sum of the propagation delay value and the delay spread value corresponding to each of the neighboring base stations 330 and 332 at operation 348. At operation 349, the serving base station 310 determines a neighboring base station to be a cooperation base station, for example, the neighboring base station 330 that includes a multi-point gain compared to an overhead occurring due to an increase in a length of the extended cyclic prefix. Hereinafter, the neighboring base station 330 is referred to as the cooperation base station 330.

At operation 350, the serving base station 310 sends a request of an uplink cooperation corresponding to the determined cooperation base station 330. In response to the cooperation base station 330 accepting the uplink cooperation request, the serving base station 310 schedules the uplink cooperation at operation 351, and transmits uplink cooperation scheduling information 352 to the uplink cooperation terminal 320 and the cooperation base station 330, respectively.

In response to the uplink cooperation scheduling information being received, the uplink cooperation terminal 320 transmits uplink cooperation data 353 to the serving base station 310 and the cooperation base station 330, respectively, based on the uplink cooperation scheduling information 352.

Subsequently, the cooperation base station 330 transfers the uplink cooperation data 354 to the serving base station 310.

In response to the cooperation base station 330 receiving the uplink cooperation data 353 from the uplink cooperation terminal 320 and the serving base station 310 receiving the uplink cooperation data 354 from the cooperation base station 330, the serving base station 310 combines the received uplink cooperation data 353 with the transferred uplink cooperation data 354 at operation 355.

FIG. 4 illustrates examples of a propagation delay and a delay spread characteristic occurring in an uplink multi-point cooperation of a wireless communication system.

Unlike a downlink cooperation, in the case of an uplink cooperation, a delay spread may increase between an uplink cooperation terminal 320 and a non-cooperation terminal 440 within a cooperation base station 330. A length of a cyclic prefix may need to increase according to an increased delay spread value. The length of the extended cyclic prefix may be determined to satisfy the following Equation 3.

$$L^i_{CP} > D^i_P + D^i_S \quad \text{[Equation 3]}$$

In the above example according to Equation 3, i denotes a neighboring base station, $L^i_{CP}$ denotes a length of a cyclic prefix needed where an uplink cooperation with the neighboring base station 330 is performed, $D^i_P$ denotes a delay difference between a signal of the non-cooperation terminal 440 and a signal of the uplink cooperation terminal 320 received by the neighboring base station 330, and $D^i_S$ denotes a delay spread value of the uplink cooperation terminal 320.

Referring to FIG. 4, in response to an uplink cooperation gain existing as compared to an overhead occurring due to an increase in the length of the extended cyclic prefix according to the above Equation 3 existing, a corresponding neighboring base station 330 may be determined as a cooperation base station 330. For example, where the following Equation 4 is satisfied, the uplink cooperation with the corresponding neighboring base station 330 may be performed.

$$\frac{R^i_{CoMP}}{R_{NoCoMP}} > \frac{1 + O^i_{CP}}{1 + O_{CP}} \quad \text{[Equation 4]}$$

where $$O_{CP} = \frac{L_{CP}}{L_{Data}},$$

$$O^i_{CP} = \frac{L^i_{CP}}{L^i_{Data}}$$

In the above example depicted in Equation 4, $R^i_{CoMP}$ denotes a reception capacity of a serving base station where a multi-node cooperation with the neighboring base station 330 is performed, $R_{NoCoMP}$ denotes the reception capacity of the serving base station 310 where the multi-node cooperation is not performed, $L^i_{CP}$ denotes the length of the cyclic prefix needed where the uplink cooperation with the neighboring base station 330 is performed, $L_{CP}$ denotes a length of a normal cyclic prefix where the uplink cooperation is not performed, $L^i_{data}$ denotes a length of data that may be input where the uplink cooperation with the neighboring base station 330 is performed, and $L_{data}$ denotes a length of data that may be generally input where the uplink cooperation is not performed.

Figure 5:
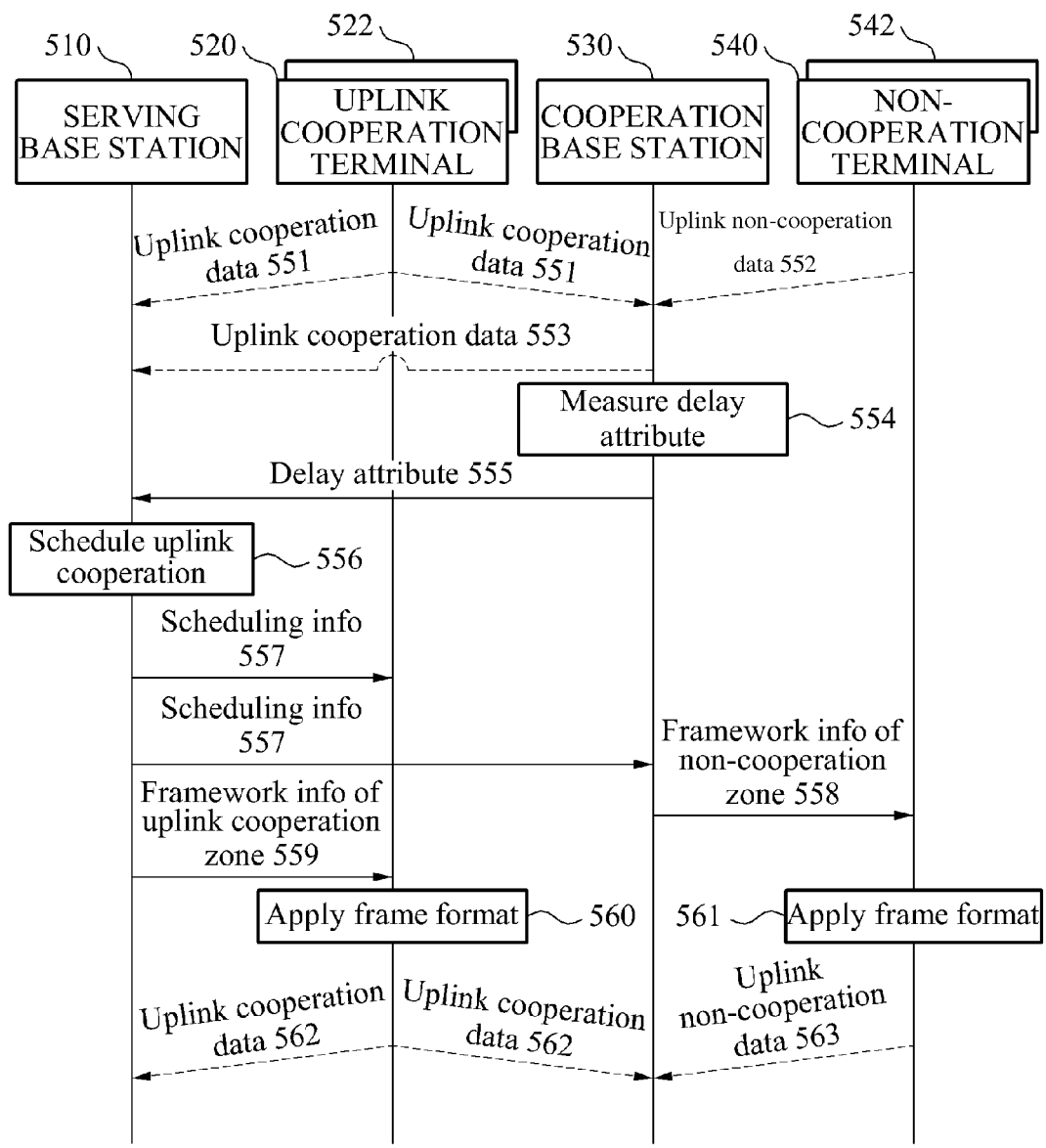
FIG. 5 is a diagram illustrating an example of an uplink communication process through a multi-point cooperation in a wireless communication system.

FIG. 5 illustrates an example of an uplink communication process through a multi-point cooperation in a wireless communication system. FIG. 5 illustrates effective uplink cooperation scheduling of a serving base station 510.

Referring to FIG. 5, uplink cooperation terminals 520 and 522 transmit uplink cooperation data 551 to the serving base station 510 and a cooperation base station 530, respectively.

Referring to FIG. 5, the cooperation base station 530 receives uplink non-cooperation data 552 from non-cooperation terminals 540 and 542, respectively, and receives the uplink cooperation data 551 from the uplink cooperation terminals 520 and 522, respectively. At operation 553, the cooperation base station 530 transmits the uplink cooperation data to the serving base station 510. At operation 554, the cooperation base station 530 measures a delay attribute of each of the uplink cooperation terminals 520 and 522, respectively. The delay attribute value may include a propagation delay value and a delay spread value. At operation 555, the cooperation base station 530 transmits the measured delay attribute of each of the uplink cooperation terminals 520 and 522 to the serving base station 510.

In response to the serving base station 510 receiving the delay attribute of each of the uplink cooperation terminals 520 and 522 from the cooperation base station 530, the serving base station 510 schedules an uplink cooperation so that uplink cooperation terminals having a similar delay attribute may be located in the same uplink cooperation zone at operation 556.

The serving base station 510 transmits scheduling information 557 to the uplink cooperation terminals 520 and 522, respectively, and the cooperation base station 530. The serving base station 510 transmits framework information 559 of the uplink cooperation zone to the uplink cooperation terminals 520 and 522, respectively.

In response to the uplink cooperation terminals 520 and 522 receiving the framework information 559, the uplink cooperation terminals 520 and 522 apply a frame format at operation 560. The uplink cooperation terminals 520 and 522 transmit uplink cooperation data 562 with the frame format applied based on the framework information to the serving base station 510 and the cooperation base station 530, respectively.

The cooperation base station 530 transmits framework information of a non-cooperation zone 558 to the non-cooperation terminals 540 and 542. At operation 561, the non-cooperation terminals 540 and 542 apply a frame format based on the framework information of the non-cooperation zone 558. At operation 563, the non-cooperation terminals 540 and 542 transmits the uplink non-cooperation data 552 with the frame format applied based on the framework information of the non-cooperation zone 558 to the cooperation base station 530.

Hereinafter, types of frame formats according to the framework information of a non-cooperation zone and the framework information of an uplink cooperation zone to prevent inter-symbol interference or inter-channel interference will be described with reference to FIGS. 6 through 9.

Figure 6:
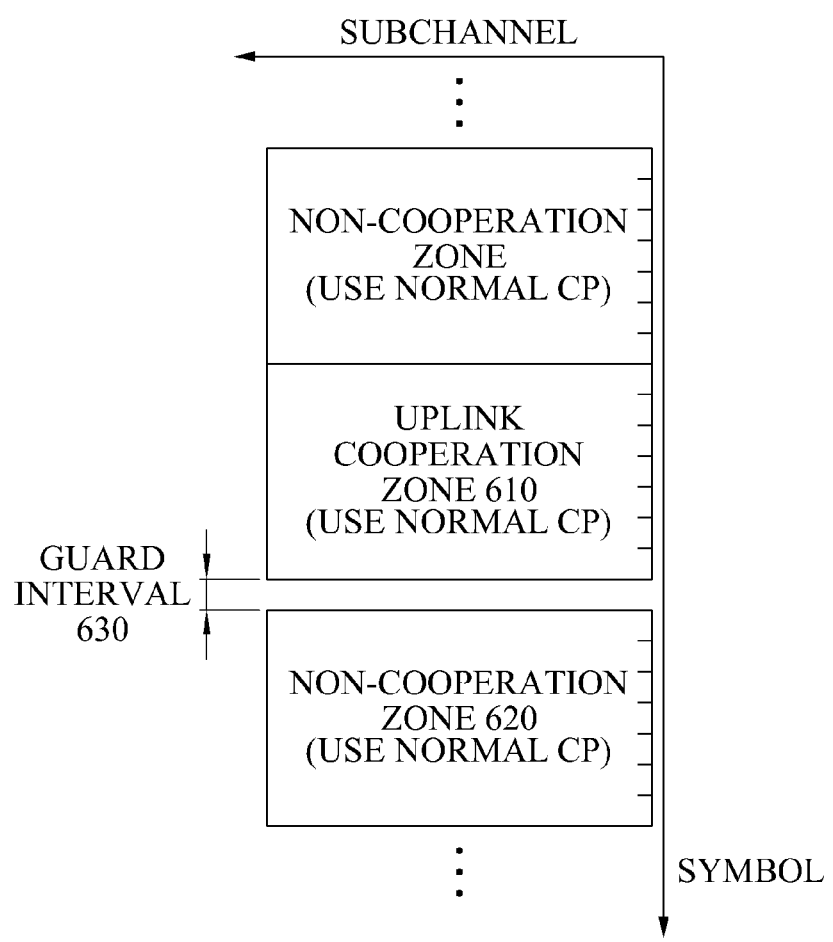
FIG. 6 is a diagram illustrating an example of a frame format corresponding to an uplink multi-point cooperation.

FIG. 6 illustrates an example of a frame format corresponding to an uplink multi-point cooperation. Referring to FIG. 6, a guard interval 630 is inserted between an uplink cooperation zone 610 and a non-cooperation zone 620 to prevent inter-symbol interference or inter-channel interference. Instead of an extended cyclic prefix, a normal cyclic prefix may be used corresponding to the uplink cooperation zone 610 and the non-cooperation zone 620.

The uplink cooperation zone 610 indicates an uplink zone to provide an uplink cooperation communication corresponding to uplink cooperation terminals having a similar delay attribute. The non-cooperation zone 620 indicates an uplink zone to provide the uplink cooperation communication corresponding to non-cooperation terminals.

Figure 7:
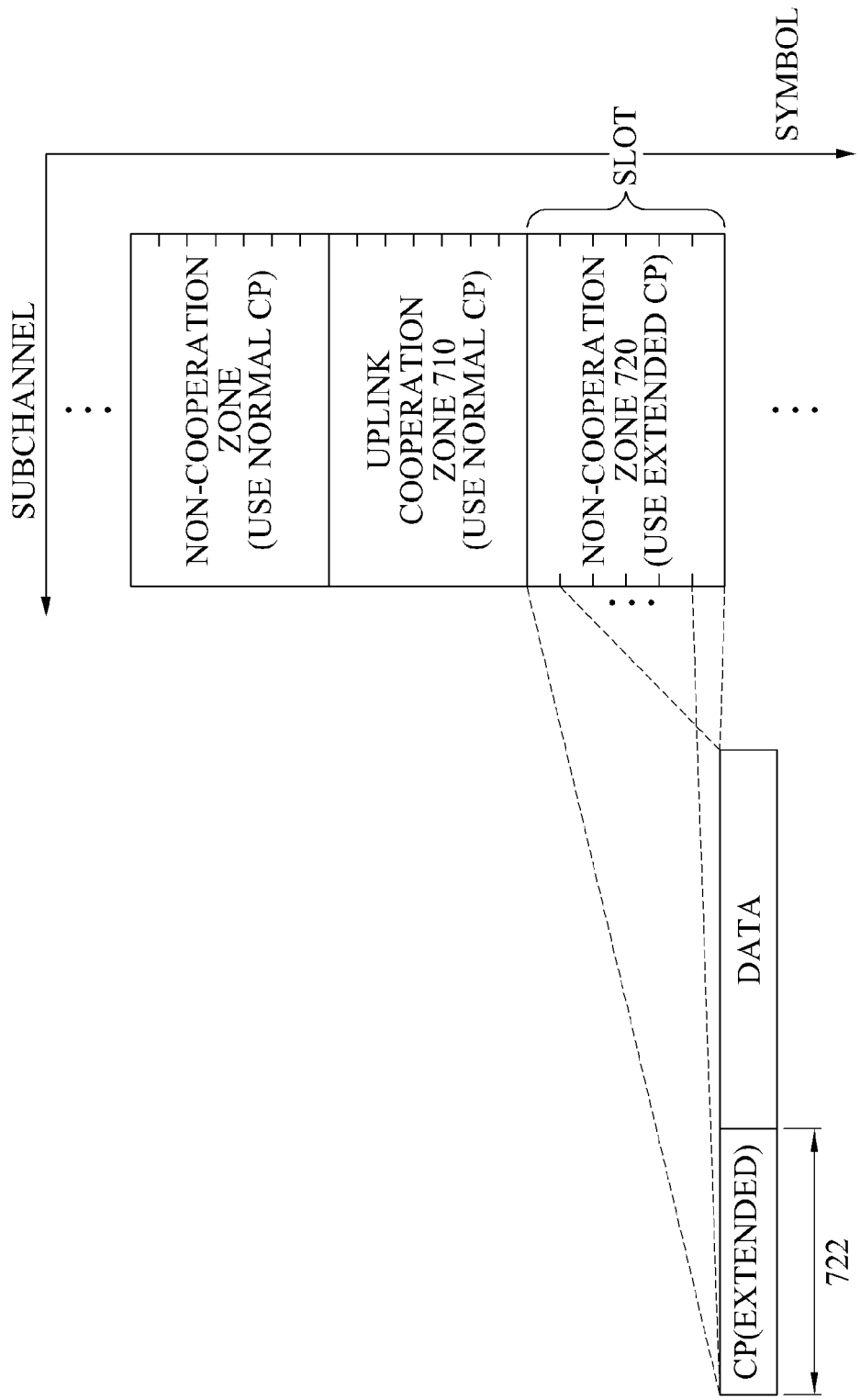
FIG. 7 is a diagram illustrating another example of a frame format corresponding to an uplink multi-point cooperation.

FIG. 7 illustrates another example of a frame format corresponding to an uplink multi-point cooperation. Referring to FIG. 7, in the frame format, a non-cooperation zone 720 located next to an uplink cooperation zone 710 includes six symbols in six slots, which is one symbol and slot less than the other non-cooperation zone and uplink cooperation zone 710. Each of the six symbols may include an extended cyclic prefix 722.

Figure 8:
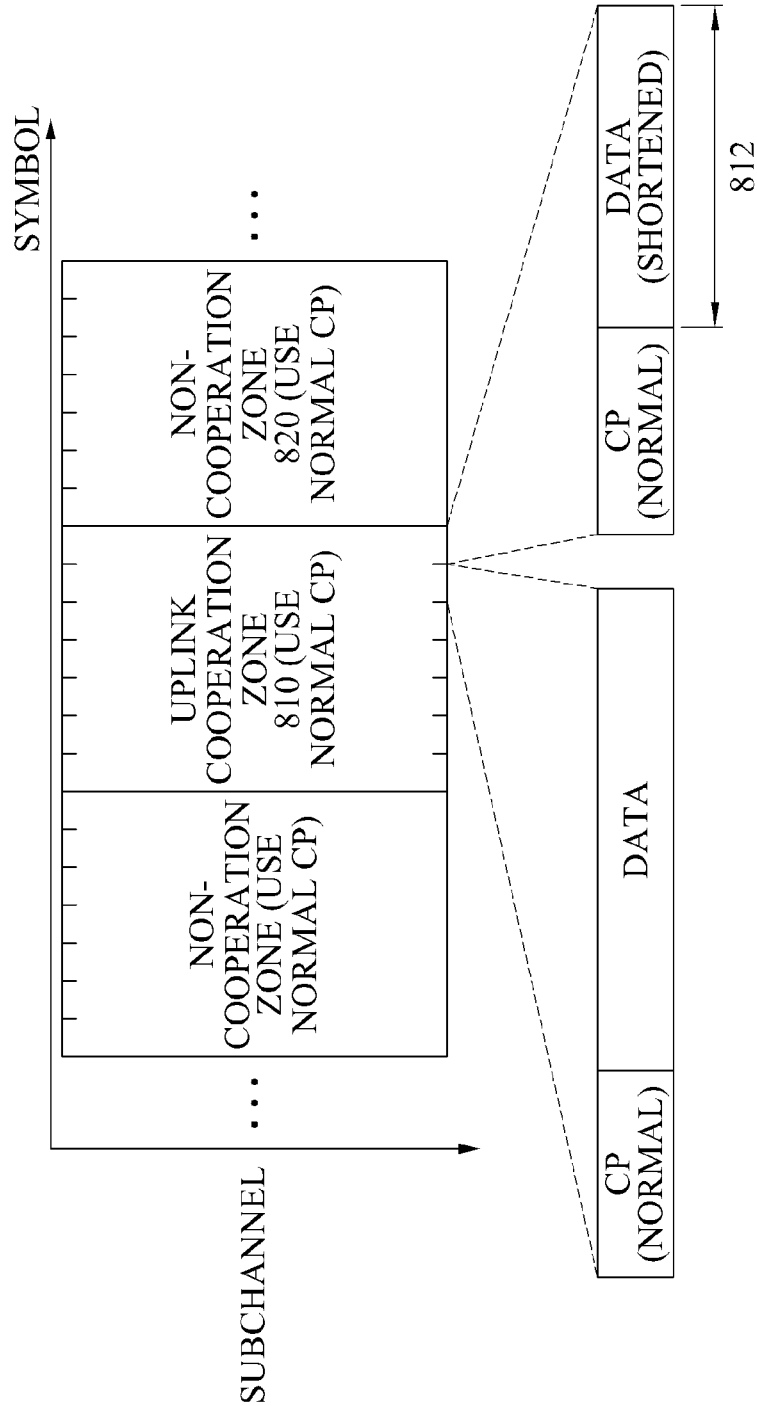
FIG. 8 is a diagram illustrating still another example of a frame format corresponding to an uplink multi-point cooperation.

FIG. 8 illustrates still another example of a frame format corresponding to an uplink multi-point cooperation. Referring to FIG. 8, a length of data 812 included in a last symbol of an uplink cooperation zone 810 may be shortened to prevent interference in a non-cooperation zone 820 that is located next to the uplink cooperation zone 810.

Figure 9:
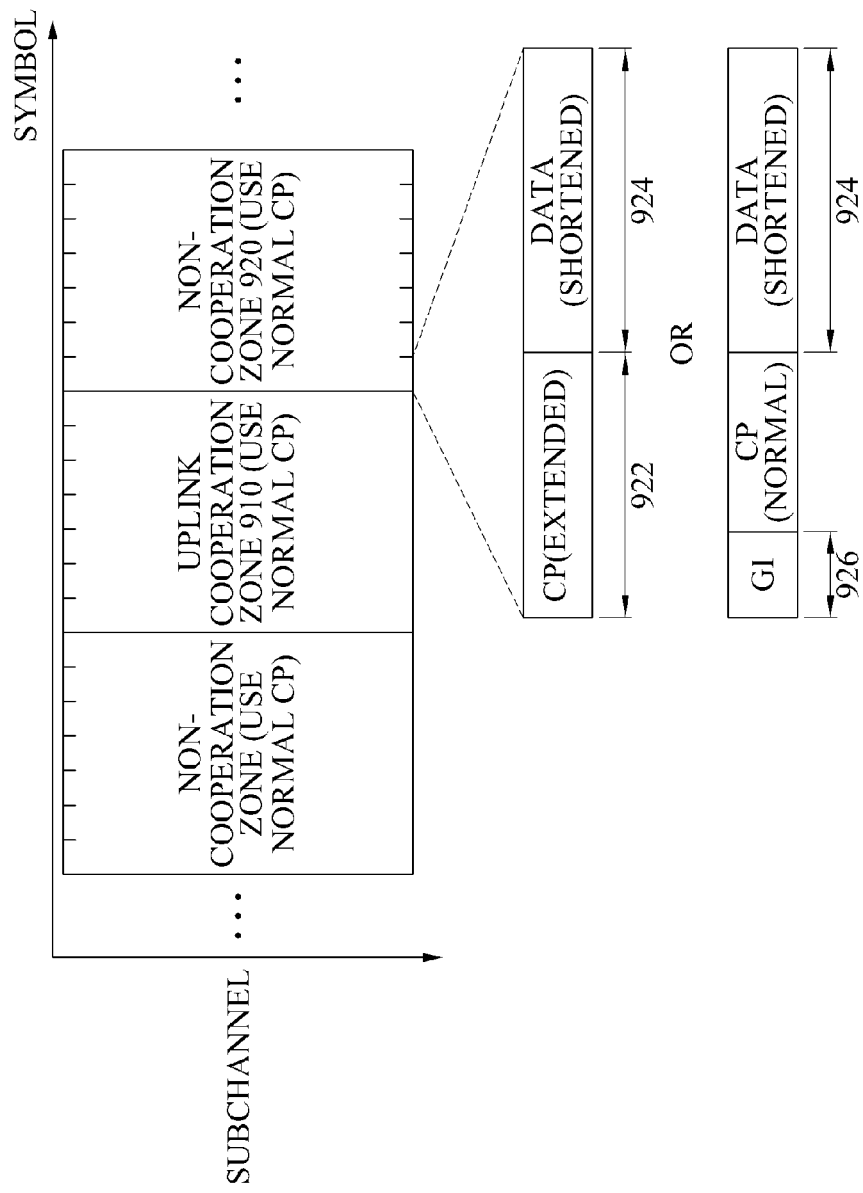
FIG. 9 is a diagram illustrating yet another example of a frame format corresponding to an uplink multi-point cooperation.

FIG. 9 illustrates yet another example of a frame format corresponding to an uplink multi-point cooperation. Referring to FIG. 9, a first symbol of a non-cooperation zone 920 located next to an uplink cooperation zone 910 includes an extended cyclic prefix 922 and data 924 having a length shortened by an amount corresponding to an extension of the cyclic prefix 922. Also, the guard interval (GI) 926 is inserted into a first symbol of the non-cooperation zone 920 and the first symbol may include data 924 having a length shortened by a length of the guard interval 926.

According to above example embodiments, where an uplink cooperation is performed, a method corresponding to a multi-node cooperation considering a delay in a wireless communication system may perform scheduling so that uplink cooperation terminals having a similar delay attribute may be classified into an uplink cooperation zone, and may provide a frame format to prevent ICI, thereby decreasing overhead occurring due to an increase in a length of a cyclic prefix. A trade-off between a performance gain increase according to a multi-node cooperation and an overhead increase according to the increase in the CP length may be solved.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal or terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, executed by a serving base station of a wireless communication system, for performing downlink multi-point cooperation, the method comprising:

receiving from a downlink cooperation terminal a channel gain value, a propagation delay value, and a delay spread value that are calculated by the downlink cooperation terminal with respect to the serving base station and each of a plurality of neighboring base stations;

determining a length of an extended cyclic prefix for each neighboring base station based on the propagation delay values of the serving base station and the neighboring base station and the delay spread value of the neighboring base station;

selecting one of the neighboring base stations as a cooperation base station, the selected base station having a multi-point cooperation gain that exceeds a measure of increased overhead to be incurred by use of the extended cyclic prefix relative to using a non-extended cyclic prefix; and transmitting, in cooperation with the cooperation base station, data to the downlink cooperation terminal.

2. The method of claim 1, wherein the determining of the length of the extended cyclic prefix for each neighboring base station comprises determining, as the extended cyclic prefix, a value greater than a sum of a delay difference between a signal received by the downlink cooperation terminal from the neighboring base station and a signal received by the downlink cooperation terminal from the serving base station and the delay spread value corresponding to the neighboring base station.

3. The method of claim 1, further comprising:
requesting the cooperation base station participate in downlink cooperation;
scheduling downlink cooperation;
transmitting downlink cooperation scheduling information to the downlink cooperation terminal and the cooperation base station; and
transmitting downlink cooperation data to the downlink cooperation terminal and the cooperation base station based on the downlink cooperation scheduling information.

4. The method of claim 3, wherein, in response to the downlink cooperation terminal receiving downlink cooperation data from the serving base station and receiving downlink cooperation data from the cooperation base station, the downlink cooperation terminal combines the downlink cooperation data of the serving base station with the downlink cooperation data of the cooperation base station.

5. A method, executed by a serving base station of a wireless communication system, for performing uplink multi-point cooperation, the method comprising:
receiving a reference signal from an uplink cooperation terminal;
calculating a channel gain value, a propagation delay value, and a delay spread value corresponding to a communication link between the serving base station and the uplink cooperation terminal, based on the reference signal;
receiving from each of a plurality of neighboring base stations a channel gain value, a propagation delay value and a delay spread value, which correspond to a communication link between the neighboring base station and the uplink cooperation terminal, that are calculated based on reception of the reference signal by the neighboring base station;
determining a length of an extended cyclic prefix for each neighboring base station based on the propagation delay value and the delay spread value corresponding to the communication link between the neighboring base station and the uplink cooperation terminal;
selecting one of the neighboring base stations as a cooperation base station, the selected base station having a multi-point cooperation gain that exceeds a measure of increased overhead to be incurred by use of the extended cyclic prefix relative to using a non-extended cyclic prefix; and
receiving, in cooperation with the cooperation base station, data from the uplink cooperation terminal.

6. The method of claim 5, wherein the determining of the length of the extended cyclic prefix for each neighboring base station comprises determining, as the extended cyclic prefix, a value greater than the sum of a delay difference between a signal received by the neighboring base station from a non-cooperation terminal and a signal received by the neighboring base station from the uplink cooperation terminal and the delay spread value corresponding to the communication link between the neighboring base station and the uplink cooperation terminal.

7. The method of claim 5, further comprising:
requesting the cooperation base station participate in uplink cooperation;
scheduling uplink cooperation;
transmitting uplink cooperation scheduling information to the uplink cooperation terminal and the cooperation base station; and
receiving uplink cooperation data from the uplink cooperation terminal and the cooperation base station based on the uplink cooperation scheduling information.

8. The method of claim 7, further comprising combining the uplink cooperation data of the uplink cooperation terminal with the uplink cooperation data of the cooperation base station.

9. A wireless base station comprising:
a receiver configured to receive from a downlink cooperation terminal a channel gain value, a propagation delay value, and a delay spread value that are calculated by the downlink cooperation terminal with respect to a serving base station and each of a plurality of neighboring base stations;
a processor configured to determine a length of an extended cyclic prefix for each neighboring base station based on the propagation delay values of the serving base station and the neighboring base station and the delay spread value of the neighboring base station;
a selector configured to select one of the neighboring base stations as a cooperation base station, the selected base station having a multi-point cooperation gain that exceeds a measure of increased overhead to be incurred by use of the extended cyclic prefix relative to using a non-extended cyclic prefix; and
a transmitter configured to transmit, in cooperation with the cooperation base station, data to the downlink cooperation terminal.

\* \* \* \* \*